US006526259B1

United States Patent
Ho

(10) Patent No.: US 6,526,259 B1
(45) Date of Patent: Feb. 25, 2003

(54) PORTABLE SELF-SIMILAR TRAFFIC GENERATION MODELS

(75) Inventor: Jin-Meng Ho, Parsippany, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/546,332

(22) Filed: Apr. 10, 2000

Related U.S. Application Data
(60) Provisional application No. 60/136,154, filed on May 27, 1999.

(51) Int. Cl.[7] .............................................. H04B 17/00
(52) U.S. Cl. ..................................... 455/67.1; 370/230
(58) Field of Search .............................. 455/67.1, 446; 370/230, 235, 232, 253, 338; 703/21; 709/224

(56) References Cited

U.S. PATENT DOCUMENTS

| | | | | |
|---|---|---|---|---|
| 5,257,364 A | * | 10/1993 | Melamed et al. | 703/21 |
| 5,448,751 A | * | 9/1995 | Takenaka et al. | 455/450 |
| 5,583,792 A | * | 12/1996 | Li et al. | 709/224 |
| 5,594,940 A | * | 1/1997 | Peterson et al. | 455/429 |
| 5,748,098 A | * | 5/1998 | Grace | 370/242 |
| 5,886,907 A | * | 3/1999 | Abu-Amara et al. | 703/21 |
| 5,886,984 A | * | 3/1999 | Abu-Amara et al. | 370/252 |
| 6,023,622 A | * | 2/2000 | Plaschke et al. | 455/452 |
| 6,144,639 A | * | 11/2000 | Zhao et al. | 370/235 |
| 6,226,409 B1 | * | 5/2001 | Cham et al. | 382/228 |
| 6,256,490 B1 | * | 7/2001 | Yost et al. | 455/405 |
| 6,314,293 B1 | * | 11/2001 | Servi et al. | 455/450 |
| 6,393,030 B1 | * | 5/2002 | Kim et al. | 370/441 |

OTHER PUBLICATIONS

W. E. Leland et al., "On the self–similar nature of Ethernet traffic (extended version)," *IEEE/ACM Trans. Networking*, vol. 2, pp. 1–15, Feb. 1994.

V. Paxson and S. Floyd, "Wide area traffic: The Failure of Poisson modeling," *IEEE/ACM Trans. Networking*, vol. 3, pp. 226–24, Jun. 1995.
J. Beran, R. Sherman, M.S. Taqqu, and W. Willinger, "Long–range dependence in variable–bit–rate video traffic," *IEEE/ACM Trans. Commun.*, vol. 43, pp. 1–15, Feb./Mar./Apr. 1995.
A. T. Andersen and B. F. Nielsen, "A Markovian approach for modeling packet traffic with long–range dependence," *IEEE J. Select. Areas Commun.*, vol. 16, pp. 719–732, Jun. 1998.

(List continued on next page.)

*Primary Examiner*—Thanh Cong Le
*Assistant Examiner*—Tan Trinh
(74) *Attorney, Agent, or Firm*—Thomas H. Jackson, Esq.; Banner & Witkoff, Ltd.

(57) ABSTRACT

A method for mimicking a stream of self-similar traffic in a telecommunications network in which a continuous-time Poisson arrival process is applied to an $M/G/\infty$ system, such that the continuous-time Poisson arrivals have a predetermined mean arrival rate and a predetermined service time distribution. A stream of self-similar traffic is generated based on the count process of the arrivals formed in the $M/G/\infty$ system, such that the self-similar traffic has a selected mean arrival rate and a selected autocorrelation function. The generated stream of self-similar traffic is applied to a portion of a telecommunications network and a behavior of the portion of the telecommunications network is then simulated based on the applied stream of self-similar traffic. According to one aspect of the method, the predetermined service time distribution is selected based on the selected predetermined autocorrelation function, thereby the step of generating the simulation of self-similar traffic generates self-similar traffic having an exact second-order self-similarity. According to another aspect of the method, the predetermined service time distribution is selected based on a desired predetermined heavy-tailed distribution function; thereby the step of generating the simulation of self-similar traffic generates self-similar traffic having an asymptotic second-order self-similarity.

5 Claims, 3 Drawing Sheets

OTHER PUBLICATIONS

B. E. Helvik and L. Hofseth, "Self-similar traffic and multilevel source models," in *Iproc. 12th Nordic Teletraffic Seminar*, Espoo, Finland, 1995, pp. 285–298.

P. C. Keissler et al., "Markov renewal models for traffic exhibiting self-seminar behavior," in *Proc. IEEE SOUTH-EASTCON'96*, 1996, pp. 76–79.

P. Pruthi and A. Erramilli, "Heavy-tailed ON/OFF source behavior and self-semilar traffic," in *Proc. IEEE ICC '95*, 1995, pp. 445–450.

N. Likhanov et al., "Analysis of an ATM buffer with self-similar ("fractal") input traffic," in *Proc. IEEE INFO-COM'95*, 1995, pp. 985–992.

W. Willinger et al., "Self-similarity through high-variability: Statistical analysis of Ethernet LAN traffic at the source level," *IEEE/ACM Trans. Networking*, vol. 5, pp. 71–86, Feb. 1997.

M. W. Garrett and W. Willinger, "Analysis, modeling and generation of self-similar VBR video traffic," in *Proc. ACM Sigcomm'94*, 1994, pp. 269–280.

M.M. Krunz and A. M. Makowski, "Modeling video traffic using M/G/ ∞ input processes: A compromise between Markovian and LRD models," *IEEE J. Select Areas. Commun.*, vol. 16, pp. 733–748, Jun. 1998.

W.–C. Lau et al., "Self-similar traffic generation: The random midpoint displacement algorithm and its properties," in *Proc. IEEE ICC'95*, 1995, pp. 66–472.

I. Norros, "A storage model with self-similar input," *Queuing Syst.*, vol. 16, p. 387–396, 1994.

A. Erramilli et al., "Experimental queuing analysis with long-range dependent packet traffic," *IEEE/ACM Trans. Networking*, vol. 4, pp. 209–223, Apr. 1996.

M. Parulekar and A. M. Makowski, "Tail probabilities for a multiplexer with self-similar traffic," in *Proc. IEEE INFO-COM'96*, 1996, pp. 1452–1455.

D. R. Cox, "Long—range dependence: A review," in *Statistics: An Appraisal, Proc 50th Anniv. Conf.*, H. A. David and H. T. David, Eds. Ames, IA: Iowa State Univ. Press, 1984, pp. 55–74.

D. R. Cos and V. Isham, *Point Processes*. London, England: Chapman and Hall, 1980, Sec. 5.6.

J.–F. Frigon and V. C>M. Leung, "A pseudo–Bayesian Aloha algorithm with mixed priorities for wireless ATM," in *Proc. IEEE PIMRC'98*, 1998, pp. 45–49.

J. L. Massey, Collision–resolution algorithms and random–access communications, in Multi–User Communication Systems, G. Longo, Ed., CISM Courses and Lectures No. 265. New York: Springer, 1981, pp. 73–137.

R. G. Gallager, Conflict resolution in random access broadcast networks, in Proc. AFOSR Workshop on Communication Theory and Applications, Provincetown, MA, 1978, pp. 74–76.

B. S. Tsybakov et al., Random Multiple Packet Access: Part–and–try algorithm, pp. 305–317 in Plenum Press translation of article in Problemy Peredachi Informatsii, vol. 16, pp. 65–79, 1980.

B. Ryu et al., "The importance of long–range dependence of VBR video traffic in ATM traffic engineering: Myths and realities," in *Proc. ACM Sigcomm'96*, 1996, pp. 3–14.

M. Grossglauser et al., "On the relevance of long–range dependence in network traffic," in *Proc. ACM Sigcomm'96*, 1996, pp. 26–30.

R. L. Rivest, "Network control by Bayesian Broadcast," *IEEE Trans. Inform. Theory*, vol. IT–33, pp.323–328, May 1987.

M. Livny et al., "The Impact off Autocorrelation on Queuing Systems," *Management Science*, vol. 39, pp. 322–339, Mar. 1993.

J. Capetanakis, "Tree Algorithms for Packet Broadcast Channels," *IEEE Trans. Networking*, vol. IT–25, pp. 505–515, Sep. 1979.

P. Mathys et al., "Q–ary Collision Resolution Algorithms in Random–Access Systems with Free or Blocked Channel Access," *IEEE Trans. on Information Theory*, vol. IT–31, Mar. 1985.

* cited by examiner

PORTABLE SELF-SIMILAR TRAFFIC GENERATION MODELS

This application is a continuation of U.S. patent application Ser. No. 60/136,154 filed May 27, 1999.

BACKGROUND OF THE INVENTION

1. Field of the Invention

The present invention relates to the field of telecommunications. More particularly, the present invention relates to a method for generating self-similar packet traffic having selected characteristics that can be used for simulating telecommunications network behavior based on the generated self-similar packet traffic.

2. Description of the Related Art

Traditional traffic models used for characterizing the behavior of a telecommunications network, such as traffic models that are based on a Poisson process, do not sufficiently model the bursty nature of broadband telecommunications. The introduction of self-similar processes for characterizing modern network packet traffic has led to various studies for modeling and generating self-similar traffic, as well as for determining the effects of traffic self-similarity and multiplexing on queuing performance and network design. One important property of self-similar traffic is that the traffic distribution decays relatively slowly ("heavy-tailed", such as a Pareto distribution) as opposed to having an exponential decay ("light tailed", such as a Poisson distribution). Another important property of self-similar traffic is that self-similar traffic has a correlation exhibiting a hyperbolic decay ("long range dependence", or LRD) rather than an exponential decay ("short range dependence, or SRD).

It has been demonstrated that traffic having self-similarity characteristics has a considerable impact on network buffer performance. See, for example, N. Likhanov et al., Analysis of an ATM buffer with self-similar ("fractal") input traffic, in Proc. IEEE INFOCOM'95, 1995, pp. 985–992; I. Norros, A storage model with self-similar input, Queueing Syst., vol. 16, pp. 387–396, 1994; A. Erramilli et al., Experimental queuing analysis with long-range dependent packet traffic, IEEE/ACM Trans. Networking, vol. 4, pp. 209–223, April 1996; and M. Parulekar et al., Tail probabilities for a multiplexer with self-similar traffic, in Proc. IEEE INFOCOM'96, 1996, pp. 1452–1455. The extent of the impact on network buffer performance may also depend on networking arrangements. See, for example, B. S. Tsybakov et al., supra; B. Ryu et al., The importance of long-range dependence of VBR video traffic in ATM traffic engineering: Myths and realities, in Proc. ACM Sigcomm'96, 1996, pp. 3–14; and M. Grossglauser et al., On the relevance of long-range dependence in network traffic, in Proc. ACM Sigcomm'96, 1996, pp. 26–30. The persistent nature of self-similar traffic has caused a somewhat extreme belief that burstiness becomes even more bursty with multiplexing over source or time, thus casting doubt on statistical multiplexing gains based on self-similar traffic streams.

One proposed model for simulating self-similar traffic is based on a superposition of a small number of Markov modulated Poisson processes (MMPP) and is disclosed by A. T. Andersen et al., A Markovian approach for modeling packet traffic with long-range dependence, IEEE J. Select. Areas Commun., vol. 16, pp. 719–732, June 1998. Another model based on Markov renewal processes (P) has been proposed by B. E. Helvik et al., Self-similar traffic and multilevel source models, in Proc. 12th Nordic Teletraffic Seminar, Espoo, Finland, 1995, pp. 285–298; and P. C. Kiessler et al., Markov renewal models for traffic exhibiting self-similar behavior, in Proc. IEEE SOUTHEASTCON'96, 1996, pp. 76–79.

Use of a superposition of a large number of heavy-tailed on-off sources governed by chaotic maps has been proposed by P. Pruthi et al., Heavy-tailed ON/OFF source behavior and self-similar traffic, in Proc. IEEE ICC'95, 1995, pp. 445–450. A model using a superposition of a large number of heavy-tailed on-off sources governed by a Pareto distribution has been proposed by N. Likhanov et al., supra; and W. Willinger et al., Self-similarity through high-variability: Statistical analysis of Ethernet LAN traffic at the source level, IEEE/ACM Trans. Networking, vol. 5, pp. 71–86, February 1997.

A model based on fractional autoregressive integrated moving average (ARIMA) processes has been proposed by W. E. Leland et al., On the self-similar nature of Ethernet traffic (extended version), IEEE/ACM Trans. Networking, vol. 2, pp. 1–15, Febuary 1994; M. W. Garrett et al., Analysis, modeling and generation of self-similar VBR video traffic," in Proc. ACM Sigcomm'94, 1994, pp. 269–280; and M. M. Krunz et al., Modeling video traffic using M/G/∞ input processes: A compromise between Markovian and LRD models, IEEE J. Select Areas Commun., vol. 16, pp. 733–748, June 1998.

Models based on fractional Brownian motion (FBM) or fractional Gaussian noise (FGN) processes has been proposed by W. E. Leland et al., supra; W. -C. Lau et al., Self-similar traffic generation: The random midpoint displacement algorithm and its properties, in Proc. IEEE ICC'95, 1995, pp. 66–472; I. Norros, supra; and A. Erramilli et al., supra.

While the models based on Markovian and the on-off source superposition approaches have the respective advantages of being analytically tractable and physically meaningful, all the proposed models mentioned above, except for the model based on FGN, have the drawback of describing self-similarity only asymptotically and only over a limited range of time scales. The model based on FGN yields exactly second-order self-similar traffic. Nevertheless, the proposed models require intensive computations for computer synthesis of self-similar traffic traces, such as used for Monte Carlo simulation of network performance under self-similar traffic patterns.

An effective model for generating self-similar traffic is based on an M/G/∞ count process. See, for example, D. R. Cox, Long-range dependence: A review, Statistics: An Appraisal, in Proc. 50th Anniv. Conf., H. A. David et al., Eds. Ames, Iowa: Iowa State Univ. Press, 1984, Iowa State Statistical Library, pp. 55–74; and D. R. Cos et al., Point Processes, London, England: Chapman and Hall, 1980, Sec. 5.6. Such a model has been suggested for generating asymptotically second-order self-similar traffic by V. Paxson et al., Wide area traffic: The Failure of Poisson modeling, IEEE/ACM Trans. Networking, vol. 3, pp. 226–244, June 1995; and by J. -F. Frigon et al., A pseudo-Bayesian Aloha algorithm with mixed priorities for wireless ATM in Proc. IEEE PIMRC'98, 1998, pp. 45–49. It should be noted, though, that the example considered by J. -F. Frigon et al. does not lead to self-similarity because the resulting autocorrelation does not behave hyperbolically. A model based on the M/G/∞ count process has also been proposed by M. M. Krunz et al., supra, that uses on a discrete-time Poisson input process.

In view of the foregoing, what is needed is a technique for conveniently generating self-similar traffic having selected characteristics that can be used for modern simulating telecommunications network behavior based on the generated self-similar packet traffic.

SUMMARY OF THE INVENTION

The present invention provides a technique for conveniently generating self-similar traffic having selected characteristics that can be used for simulating modern telecommunications network behavior based on the generated self-similar packet traffic.

The advantages of the present invention are provided by a method for mimicking streams of self-similar traffic in a telecommunications network. A continuous-time Poisson arrival process is applied to an M/G/∞ system, such that the continuous-time Poisson arrivals have a predetermined means arrival rate and a predetermined service time distribution. A stream of self-similar traffic is generated based on the count process of the arrivals formed in the M/G/∞ system, such that the self-similar traffic has a selected mean arrival rate and a selected autocorrelation function. The generated stream of self-similar traffic is applied to a portion of a telecommunications network and a behavior of the portion of the telecommunications network is then simulated based on the applied stream of self-similar traffic. According to one aspect of the present invention, the predetermined service time distribution is selected based on the selected predetermined autocorrelation function, thereby the step of generating the stream of self-similar traffic generates self-similar traffic having an exact second-order self-similarity. According to another aspect of the present invention, the predetermined service time distribution is selected based on a desired predetermined heavy-tailed distribution function, thereby the step of generating the stream of self-similar traffic generates self-similar traffic having an asymptotic second-order self-similarity.

BRIEF DESCRIPTION OF THE DRAWING

The present invention is illustrated by way of example and not limitation in the accompanying figures in which like reference numerals indicate similar elements and in which.

DETAILED DESCRIPTION

Figure 1A:
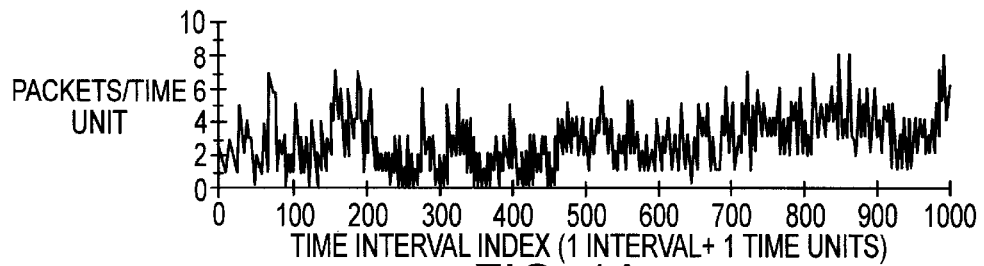
FIGS. 1(a)–1(e) show synthesized packet arrival rates of exactly second-order self-similar traffic having H=0.90 generated according to the present invention and averaged over a range of time scales.
Figure 1B:
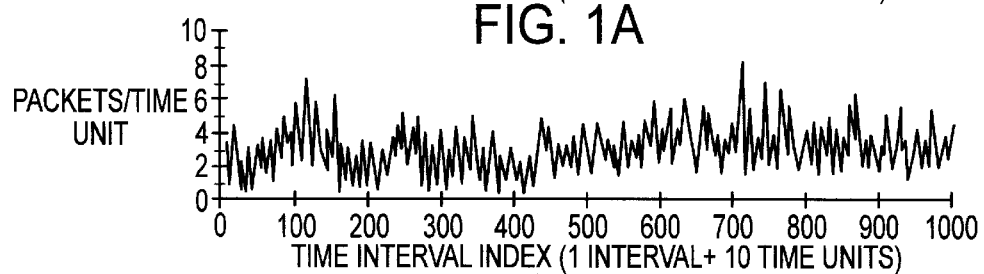
Figure 1C:
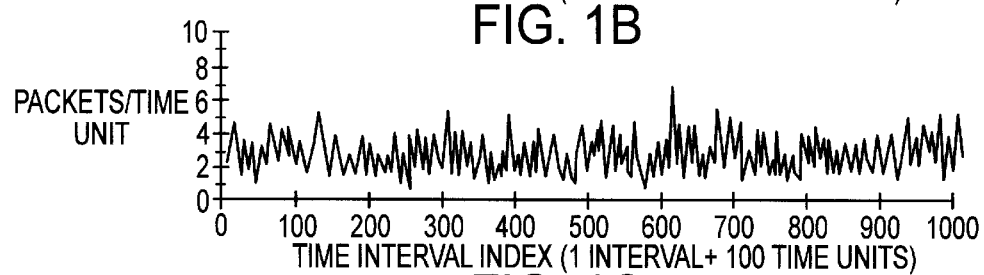
Figure 1D:
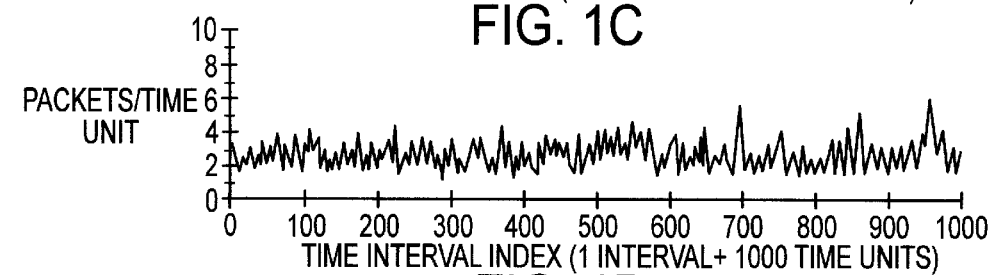
Figure 1E:
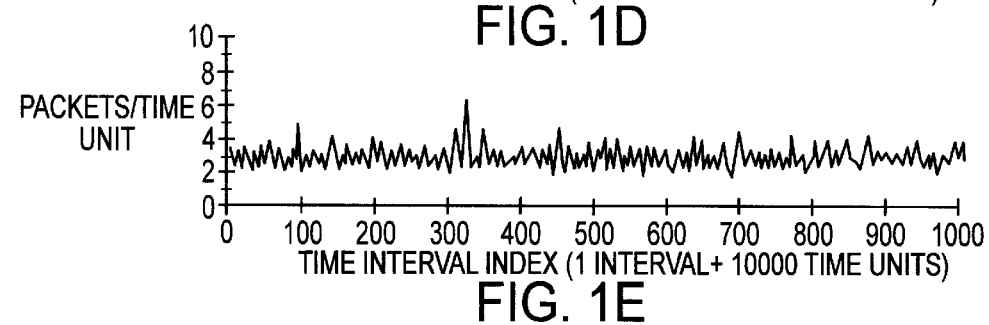

The present invention provides a technique for conveniently generating self-similar traffic having selected characteristics that can be used for simulating telecommunications network behavior based on the generated self-similar packet traffic. In that regard, The present invention applies a simple continuous-time Poisson point process to the M/G/∞ system, thereby effortlessly generating continuous-time arrival processes exhibiting second-order self-similarity, both exact and asymptotic. Continuous-time arrival processes are useful in performance evaluation involving continuous-time intervals as in the case of certain random access tree algorithms. For example, see, J. L. Massey, Collision-resolution algorithms and random-access communications, in Multi-User Communication Systems, G. Longo, Ed., CISM Courses and Lectures No. 265. New York: Springer, 1981, pp. 73–137; R. G. Gallager, Conflict resolution in random access broadcast networks, in Proc. AFOSR Workshop on Commun. Theory and Applications, Provincetown, Mass., 1978, pp. 74–76; and B. S. Tsybakov et al., Random multiple packet access: Part-and-try algorithm, pp. 305–317 in Plenum Press translation of article in Problemy Peredachi Informatsii, vol. 16, pp. 65–79, 1980.

I. M/G/∞ Processes and Properties

To illustrate the present invention, the processes and properties of an M/G/∞ system are first considered. With Poisson customer arrivals to an M/G/∞ system of independent identically distributed (i.i.d.) service time distributions, the number of customers in the system is a Poisson process, regardless of the service time distribution form. Specifically, if the mean arrival rate is $\lambda$ and the mean service time is $\bar{x}$, the number of customers in the system at a given time t is Poisson distributed having mean $$E\{N(t)\}=\lambda\bar{x}. \quad (1)$$

Further, N(t) and N(t+τ) are correlated according to $$C(\tau)\equiv\mathrm{Cov}\{N(t),N(t+\tau)\}=\lambda\int_{96}^{\infty}[1-F(x)]dx, \quad (2)$$

where F(x) is the cumulative distribution function (c.d.f.) of the service time x. Clearly, N(t) is a wide-sense stationary count process. Thus, N(t) can be used for describing packet traffic exhibiting certain autocorrelation structure if N(t) is adapted to represent the number of new packets generated over the unit time interval [t−1, t). The unit of time may be chosen to be a slot, a frame, and the like.

To this end, it suffices to have each customer, starting from its arrival, generate a new packet every unit-time interval during its life time (i.e., service time) in the system with the life time $L_i$ for each customer i independently drawn from a discrete distribution $P\{L_i=k\}=p_k$, k=1, 2, . . . Aggregating all the traffic substreams each having $L_i$ packets over the customer set thus gives rise to the desired packet traffic stream having mean arrival rate $\lambda_G=\lambda\bar{L}$, where $\bar{L}=E\{L_i\}$, and having autocorrelation function r(k)=C(k)/C(0). The relation between r(k) and $p_k$ is governed by Eq. (2), which now reduces to $$C(k) = \lambda\sum_{n=k}^{\infty}[1-F(n)], \quad (3)$$

or, equivalently, $$C(k)-C(k+1)=\lambda[1-F(k)]. \quad (4)$$

Recalling that $p_k=F(k)-F(k-1)$, it follows that $$p_k = \frac{r(k+1)-2r(k)+r(k-1)}{1-r(1)}, k=1, 2, \ldots, \quad (5)$$

where use has been made of $C(0)=\lambda/[1-r(1)]$ as found from Eq. (4) upon setting F(0)=0. Consequently, any traffic having a desired mean arrival rate $\lambda_G$ and autocorrelation function r(k) can be easily generated from the M/G/∞ system having a Poisson input rate $\lambda=\lambda_G/\bar{L}$ and a service time distributed according to Eq. (5). The resulting process is a bivariate process that is descriptive of spread batch arrivals within individual arrivals to the M/G/∞ system.

II. Self-Similar Traffic Synthesis and Analysis

For continuous Poisson input and discrete service time, the arrival process of the bivariate M/G/∞ model is completely specified once the service time distribution has been determined. In view of Eq. (5), a service time distribution can be obtained to exactly meet any autocorrelation requirement. Thus, an exactly second-order self-similar traffic stream is obtained. Conversely, known forms for the service time distribution may be utilized for approximating certain autocorrelation structures, if desired asymptotic autocorrelation properties can be established via Eq. (3). This approach leads to the construction of asymptotically second-order self-similar traffic.

A. Exactly Second-Order Self-Similar Traffic

Exactly second-order self-similar traffic may be defined as $$r(k) = \frac{1}{2}(|k+1|^{2H} - 2|k|^{2H} + |k-1|^{2H}), \tag{6}$$

where $H \epsilon(½,1)$ is called the Hurst parameter characteristic of the degree of self-similarity. Such an expression uniquely guarantees the identity that $r(k)=r^{(m)}(k)$ for $m=1, 2, \ldots$, with $r^{(m)}(k)$ denoting the normalized autocovariance of the mean aggregate process $N^{(m)}(t)=[\Sigma_{i=0}^{m-1}N(tm+i)]/m$. Also, $r(k) \sim H(2H-1)k^{-\beta}$, $\beta=2(1-H)\epsilon(0,1)$, as $k \to \infty$, confirming that exact second-order self-similarity implies long-range dependence.

Given a sample u of a random variable that is uniformly distributed over (0,1), the service time will be $L_i=n$, $n=1, 2, \ldots$, if $F(n-1)<u \leq F(n)$, where, from Eq. (5), $$F(n) \equiv \sum_{k=1}^{n} p_k = \frac{1-r(1)-r(n)+r(n+1)}{1-r(1)}, n=1,2,\ldots. \tag{7}$$

Use of Eq. (6) leads to $F(n)=1-G_n/(4-4^H)$, with $$G_n=(n-1)^{2H}-3n^{2H}+3(n+1)^{2H}-(n+2)^{2H}. \tag{8}$$

Therefore, $L_i=n$, $n \geq 1$, if $G_n \leq (4-4^H)u<G_{n-1}$.

Furthermore, the expected service time is given by $$\bar{L}=E\{L_i\}\Sigma_{k=1}^{\infty}kp_k=2/(4-4^H), \tag{9}$$

while the variance of the service time is infinite unless $H<½$ (not a case for self-similar traffic). Finally, $F(n) \sim 1-cn^{-\alpha}$, $c=H(2H-1)(1-H)/(1-4^{H-1})$, $\alpha=3-2H$, as $n \to \infty$. With $H \epsilon(½, 1)$, as specified earlier, $c>0$ and $1<\alpha<2$, thereby indicating that the service time has a heavy-tailed distribution. It may also be noted that if the Hurst parameter value is extended to $H=½$, $r(k)=0$ for $k \neq 0$, and hence $p_1=1$, $p_k=0$ for $k>1$, thereby reducing the bivariate count process to the univariate input Poisson process.

B. Asymptotically Second-Order Self-Similar Traffic

Having established heavy-tailed distributed service time to be a necessary condition for exact self-similarity, it can be shown that it is a sufficient condition for asymptotic self-similarity. To this effect, the service time is chosen to be represented by the simplest heavy-tailed distribution, the discrete Pareto distribution, having a shape parameter a and a location parameter b $$F(n) = 1 - \left(\frac{b}{n+1}\right)^\alpha, n \geq \lfloor b \rfloor, 1<a<2, \tag{10}$$

where $\lfloor b \rfloor$ designates the largest integer that is not greater than b. Without loss of the asymptotic nature of F(n), the conventional form of the denominator has been revised in Eq. (10) so that for the simple value of b=1, n starts from 1 instead of 2.

Given Eq. (10), the autocorrelation may be found from Eq. (3) to behave like $r(k) \sim dk^{-\beta}$, as $k \to \infty$, where d is a constant and $\beta=\alpha-1\epsilon(0,1)$. This shows that a Pareto distributed service time indeed leads to asymptotically second-order self-similar, or equivalently, long-range dependent traffic characterized by the Hurst parameter $H=1-\beta/2=(3-\alpha)/2\epsilon(½, 1)$. As for exactly second-order self-similar traffic, $\alpha=3-2H$.

Generation of the service time sequence is again obtained by setting $L_i=n$ if $F(n-1)<u \leq F(n)$, which now admits of a closed-form expression, $$L_i=\lceil bu_\alpha \rceil -1, u_\alpha=u^{-1/\alpha}, \tag{11}$$

where $\lceil x \rceil$ denotes the smallest integer that is not less than x. It is also readily verified that with $1<\alpha<2$, the service time has a finite mean $$\bar{L}=E\{L_i\}=\lfloor b \rfloor(b/\lfloor b \rfloor)^\alpha+\Sigma_{n=\lfloor b \rfloor+1}^{\infty}(b/n)^\alpha, \tag{12}$$

but infinite variance, just as for exact self-similarity (finite variance exists only if $\alpha>2$, i.e., $H<½$). Finally, unlike the exactly self-similar model, the asymptotic self-similar model does not degenerate to a regular Poisson point process for $H=½$, although "burstiness" of the corresponding synthetic traffic indeed subdues considerably.

C. Synthetic Traffic Examples

Some traffic streams, as synthesized from the M/G/∞ bivariate process according to the present invention, are now presented as a visual test of both the exactly and asymptotically self-similar patterns, as well as the bursty features associated with different values of the Hurst parameter H. Only a generic time unit is required for defining the basic count process. Mean aggregate processes are obtained by averaging over increasing sizes of time intervals. To facilitate comparison, and in consistence with the definition cited previously for $N^{(m)}(t)$, the ordinate is normalized to represent the number of packets per time unit for all aggregate count processes.

FIGS. 1(a)–1(e) show synthesized packet arrival rates of exactly second-order self-similar traffic having H=0.90 generated according to the present invention and averaged over a range of time scales. It should also be noted that all traffic stream examples shown in FIGS. 1(a)–1(e) have been generated for $\lambda_6=3$ packets per time unit. Other packet arrival rates have been found to give rise to self-similar patterns and bursty features as well.

FIG. 1 resembles FIG. 4 of W. E. Leland et al., supra, which is drawn from measured Ethernet traffic exhibiting self-similarity over different time scales. Recalling the normalization process applied to FIG. 1, FIG. 4(a) of W. E. Leland et al. should be compressed vertically by a factor of 2.5. The fluctuation, or burstiness, of the traffic count process of the present invention, however, gradually decreases with increasing order of time averaging processes. Such smoothing behavior also occurs when traffic patterns generated from different arrival rates are compared with the ordinates scaled proportionally to the respective arrival rates, thereby indicating smoothing over source multiplexing. Such smoothing properties suggest that time or source multiplexing may suppress the effects of self-similarity on certain network performance, as confirmed below.

One of the aggregate processes for both exactly and asymptotically second-order self-similar traffic shown in FIG. 1 was extracted, parameterized by H and compiled into FIG. 2. In that regard, FIGS. 2(a)–2(e) show synthesized packet arrivals of exactly and asymptotically second-order self-similar traffic having different H values, but over the same time scale, generated according to the present invention. Specifically, FIGS. 2(a), 2(b) and 2(d) respectively show synthesized packet arrivals of asymptotically second-order self-similar traffic for H=0.90, 0.75 and 0.50. FIGS. 2(c) and 2(e) respectively show synthesized packet arrivals of exactly second-order self-similar traffic for H=0.75 and 0.50.

Figure 2A:
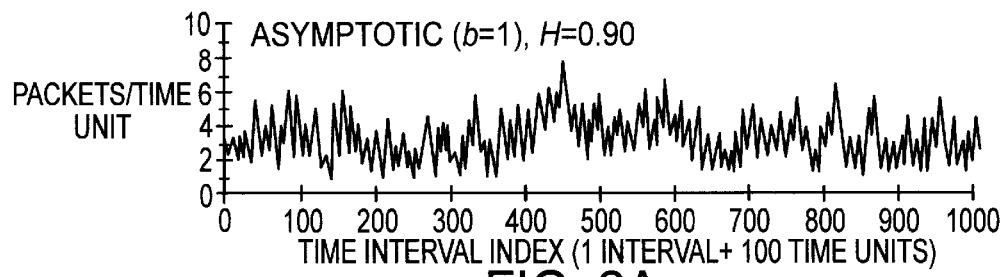
FIGS. 2(a)–2(e) show synthesized packet arrivals of exactly and asymptotically second-order self-similar traffic having different H values generated according to the present invention.
Figure 2B:
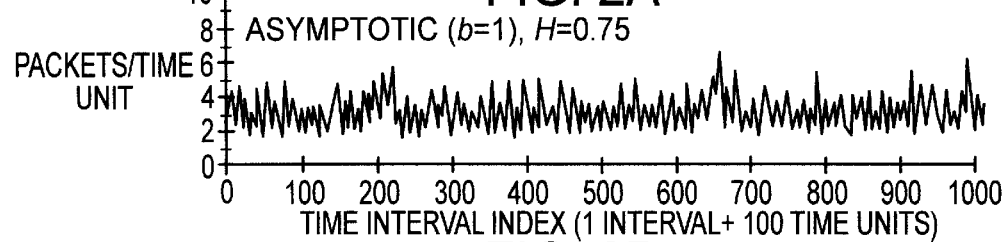
Figure 2C:
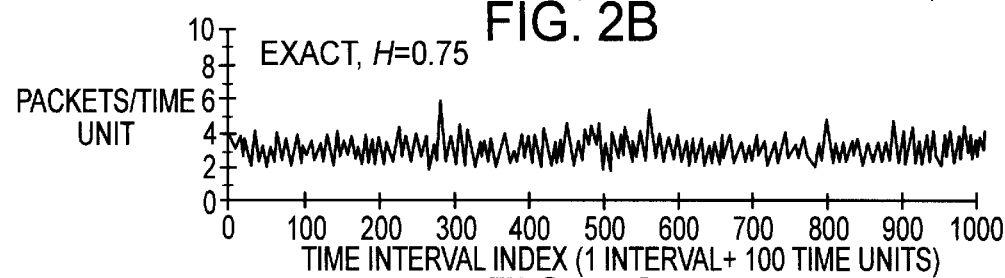
Figure 2D:
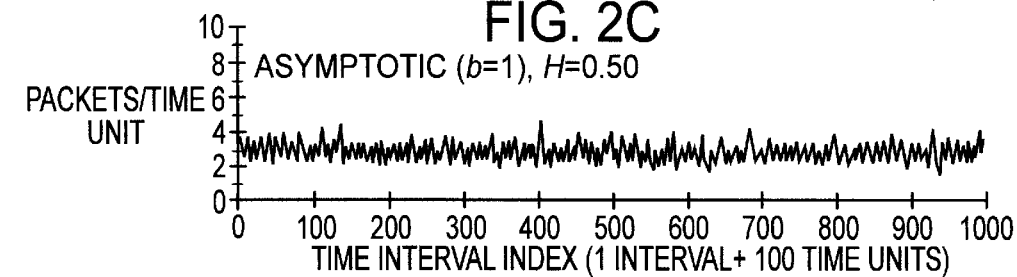
Figure 2E:
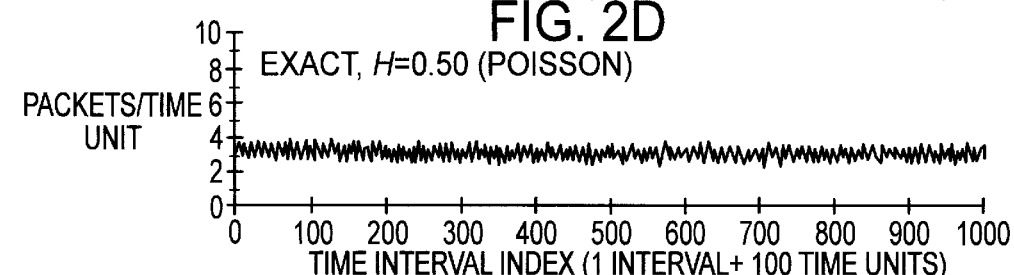

As anticipated, the smaller the H value, the less bursty the traffic. As H decreases to 0.5, the exactly second-order self-similar traffic degenerates to a Poisson distribution, as shown by FIG. 2(e). It is interesting to note that asymptotic self-similarity, as modeled by a Pareto service time distribution, appears to be more bursty than its exact counterpart having the same H value. Finally, it is worth noting that with the hybrid continuous-discrete M/G/∞ bivariate model of the present invention, one million points of self-similar traffic, either exactly or asymptotically, can be generated in about three minutes on a currently available personal computer (PC), as compared to the fractional ARIMA model disclosed by M. W. Garrett et al., supra, which requires about 10 hours to generate 171,000 points on a 1994 workstation. Accordingly, the model provided by the present invention can be conveniently incorporated into a trace-driven simulation for providing in-flight traffic arrival generation, thereby precluding a separate traffic generation and input procedure, and saving memory.

IV. Random Access Protocol Performance With Self-Similar Traffic

The popular slotted Aloha protocol and its corresponding multichannel version are now considered for illustrating the effects of input traffic patterns and of statistical multiplexing on random access protocols. A brief description of the subject is provided before the simulation results are presented.

A. Theoretical Background

The slotted Aloha protocol that is considered below has been stabilized by pseudo-Bayesian control, such as disclosed by R. L. Rivest, Network control by Bayesian Broadcast, IEEE Trans. Inform. Theory, vol. IT-33, pp. 323–328, May 1987. Consequently, delay-throughput simulation was carried out. An infinite source population model has been assumed with each source terminal having at most one packet to transmit at any given time. Moreover, a packet is successfully transmitted if and only if there is one terminal transmitting during a time slot, while collided packets resulting from simultaneous transmissions from multiple terminals are retransmitted later on. Thus, the stabilized Aloha operates as follows:

At the beginning of each time slot, say slot k, backlogged terminals (i.e., terminals having a newly arrived- or previously-collided packet) transmit their packets independently with probability $p_k=\min(1,1/n_k)$, where $n_k$ is the number of backlogged terminals at the beginning of slot k and is estimated by the pseudo-Bayesian update rule based on a binary feedback, $$n_k = \begin{cases} \lambda_e + \max(0, n_{k-1} - 1), & \text{for idle/success on slot } k-1, \\ \lambda_e + n_{k-1} + (e-2)^{-1}, & \text{for collision on slot } k-1, \end{cases} \quad (13)$$

and where $\lambda_6$ is the packet arrival rate per slot. The mean arrival rate $\lambda_6$ has been set to $\lambda_6=1/e$, instead of estimating the actual value because, for Poisson arrivals, such approximation has been shown in the literature (and also verified by the inventor of the present invention) to result in no appreciable difference in the protocol delay-throughput performance.

The multichannel slotted Aloha protocol considered herein is also defined by extending random access to a certain number c of slotted Aloha channels. By pooling multiple channels together, individual traffic streams that would otherwise transmit on separate channels were multiplexed into a single pool of channels, while the capacity of the server is accordingly increased from that of a single channel to that of a pool of channels. According to queuing theory, for unslotted contention-free transmissions, such pooling decreases the average delay by a factor of c, such as disclosed by D. Bertsekas et al., Data Networks, 2nd Ed. Upper Saddle River, N.J.: Prentice-Hall, 1992. (Note that the average delay includes both waiting time, i.e., the average delay defined in the context of random access, and transmission time, which here is equal to one time slot.)

Furthermore, under a Poisson offered load, the maximum achievable throughput of the multichannel slotted Aloha remains the same as for the unichannel slotted Aloha, as can be readily established. Conditioned on the existence of m packets (new and rescheduled) in a given slot, the average number of packets that can be successfully transmitted in the next slot over the c channels may be written as $$S_{c|m} = c\binom{m}{1}\left(\frac{1}{c}\right)\left(1-\frac{1}{c}\right)^{m-1} = m\left(1-\frac{1}{c}\right)^{m-1}. \quad (14)$$

Given a total Poisson offered load of $G_c$, the unconditional average aggregate throughput becomes $$S_c = \sum_{m=0}^{\infty} S_{c|m} e^{-G_c} \frac{G_c^m}{m!} = G_c e^{-G_c/c}, \quad (15)$$

and, hence, the average per-channel throughput is given by $$S=S_c/c=Ge^{-G}, \quad G=G_c/c. \quad (16)$$

Therefore, with an identical Poisson offered load per channel, multichannel slotted Aloha has the same throughput performance as unichannel slotted Aloha, both achieving a maximum channel throughput of 1/e.

The multichannel slotted Aloha can be stabilized by a simple extension of the above pseudo-Bayesian rule. Thus, under the same assumptions as for the unichannel Aloha, backlogged terminals transmit their respective packets independently at the beginning of slot k with probability $p_k=\min(1,c/n_k)$ into a randomly chosen channel out of the c pooled channels. Here, $n_k$ is the estimated number of total backlogged terminals at the beginning of slot k, which is updated as follows, $$n_k = \lambda_e + (e_{k-1} + s_{k-1})\max\left(0, \frac{n_{k-1}}{c} - 1\right) + c_{k-1}\left(\frac{n_{k-1}}{c} + \frac{1}{e-2}\right), \quad (17)$$

where $\lambda_6$ is the total packet arrival rate per slot and will be set to $\lambda_6 = c/e$ in the spirit stated above, while $e_{k-1}$, $s_{k-1}$ and $c_{k-1}$ respectively denote the number of empty, successful, and collided channels at slot k−1.

B. Simulation Results

Figure 3A:
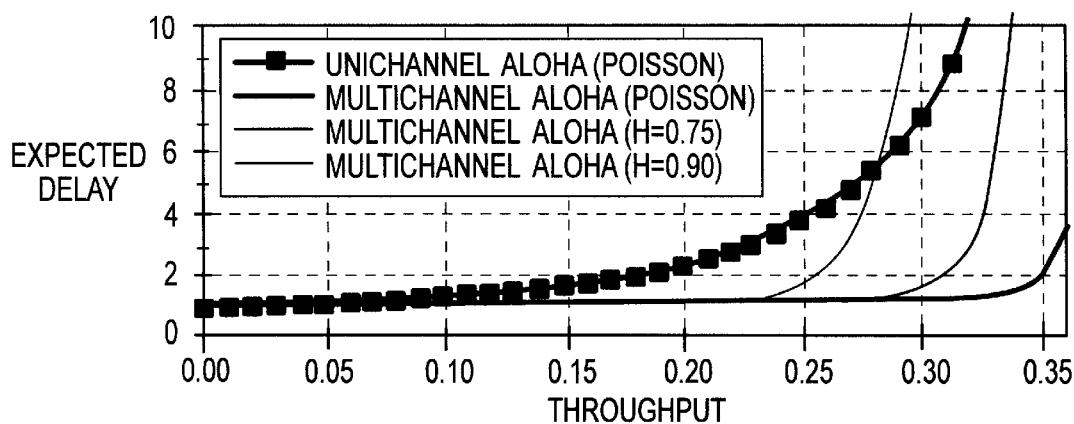
FIGS. 3(a) and 3(b) respectively show expected delay and delay variation as a function of throughput for a 1-channel and a 40-channel Aloha system having a Poisson and an exactly second-order self-similar input (H=0.75 and H=0.9).
Figure 3B:
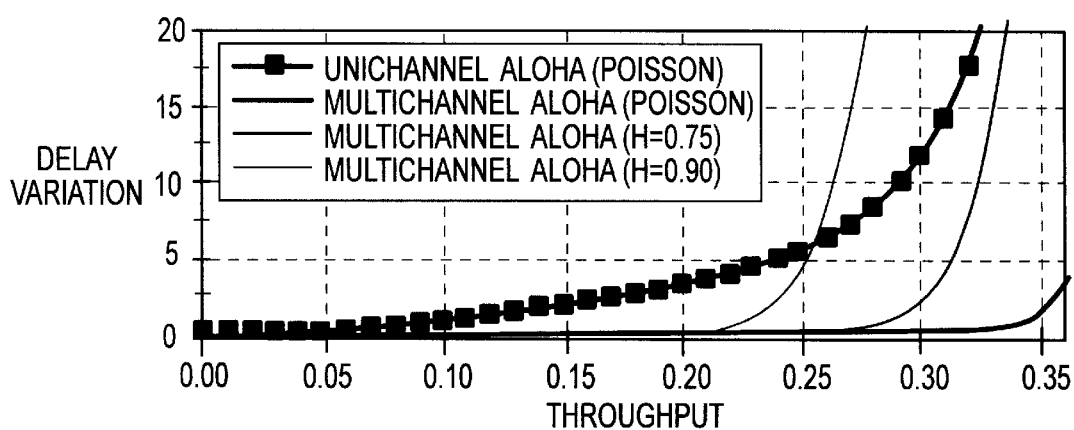

FIGS. 3(a) and 3(b) respectively show expected delay and delay variation as a function of throughput for a 1-channel and a 40-channel Aloha system having a Poisson and an exactly second-order self-similar input (H=0.75 and H=0.9).

With the aid of pseudo-Bayesian control, as described above, single- and multi-channel Aloha protocols are stable for Poisson packet arrival rates less than 1/e, in which case the arrival rate is also the channel throughput.

The effect of self-similarity on unichannel slotted Aloha was tested first. Although the run time of simulation used with modestly self-similar traffic (H=0.75) was four orders of magnitude longer than that normally used for Poisson traffic for each given packet arrival rate, a steady state still could not be reached. Similar behavior has been noted in the literature for a common channel under a tree algorithm having a self-similar input. It is here conjectured that this is caused by the self-similar nature of the input traffic, which generates packet arrivals correlated over any time scale. In particular, a traffic stream with a given average arrival rate has in a realization a certain number of packets input to the channel over some time period. Most of these packets go through the channel with some average delay and delay variation over that time period. As the run time goes beyond the defined time period, however, another series of correlated arrivals may occur within a short time interval, thereby causing the channel to be "jammed up" for a long time period and the overall mean delay and delay variation to fluctuate with the length of the total run time. The pattern of fluctuations along the run time changes not only with average arrival rate, but also with each realization (i.e., simulation) at a given mean arrival rate. Consequently, an open issue is raised whether statistical averages are still meaningful performance measures in characterizing some random access systems.

Nevertheless, it is observed that the mean delay and delay variation with modest self-similarity (H=0.75) are at least two orders of magnitude longer than those related to Poisson traffic, indicating that self-similar traffic has a deleterious impact on a single-channel multiaccess system.

On the other hand, a pseudo-Bayesian controlled 40-channel slotted Aloha is adaptable to traffic self-similarity, as shown by FIG. 3. Again, similar results were obtained when self-stable tree algorithms were used in place of stabilized Aloha algorithms. Collisions occur only on some of the pooled channels, leaving some of the other channels to partially "clear up" the arrived packets, in contrast with the single-channel case where a collision completely wastes the channel resource. Of course, the delay-throughput performance is always degraded with self-similar traffic, getting worse under high self-similarity (H=0.9), but channel multiplexing is still seen to mitigate the drastically deleterious effect that would otherwise result. In a separate study by J.-M. Ho, Packet multiple access with self-similar traffic and impaired channeling, submitted to IEEE J. Select. Areas Commun., reservation systems that operate on aggregation over time and reduce packet contention for transmission are found to exhibit greater multiplexing benefits. It may be observed that pooling frequency-division channels is essentially equivalent to pooling time-division channels.

Thus, the detrimental impact of self-similarity is drastically magnified on single-channel protocol performance, but greatly subdued on multi-channel protocol performance. That is, LRD (long-range dependent) traffic is indeed very "bursty" at individual arrival levels, as compared to SRD (short-range dependent) traffic, but in some sense its burstiness diminishes, rather than intensifies as noted in some studies, with aggregation over source or time, just as of SRD traffic.

While the present invention has been described in connection with the illustrated embodiments, it will be appreciated and understood that modifications may be made without departing from the true spirit and scope of the invention.

What is claimed is:

1. A method for mimicking a stream of self-similar traffic in a telecommunications network, the method comprising steps of:

applying a continuous-time Poisson arrival process to an M/G/∞ system, the continuous-time Poisson arrivals having a predetermined mean arrival rate and a predetermined service time distribution; and generating a mimicked stream of self-similar traffic based on a count process of the arrivals formed in the M/G/∞ system, the self-similar traffic having a selected mean arrival rate and a selected autocorrelation function.

2. The method according to claim 1, wherein the predetermined service time distribution is selected based on the selected predetermined autocorrelation function, and wherein the step of generating the mimicked stream of self-similar traffic generates self-similar traffic having an exact second-order self-similarity.

3. The method according to claim 1, wherein the predetermined service time distribution is selected based on a desired predetermined heavy-tailed distribution function, and wherein the step of generating the mimicked stream of self-similar traffic generates self-similar traffic having an asymptotic second-order self-similarity.

4. The method according to claim 1, further comprising a step of applying the generated stream of self-similar traffic to a portion of a telecommunications network.

5. The method according to claim 4, further comprising the step of simulating a behavior of the portion of the telecommunications network based on the applied stream of self-similar traffic.

* * * * *